Nov. 2, 1954     T. T. SHIGEKAWA     2,693,006
MANUFACTURE OF SPONGE RUBBER ARTICLES
Filed April 26, 1952
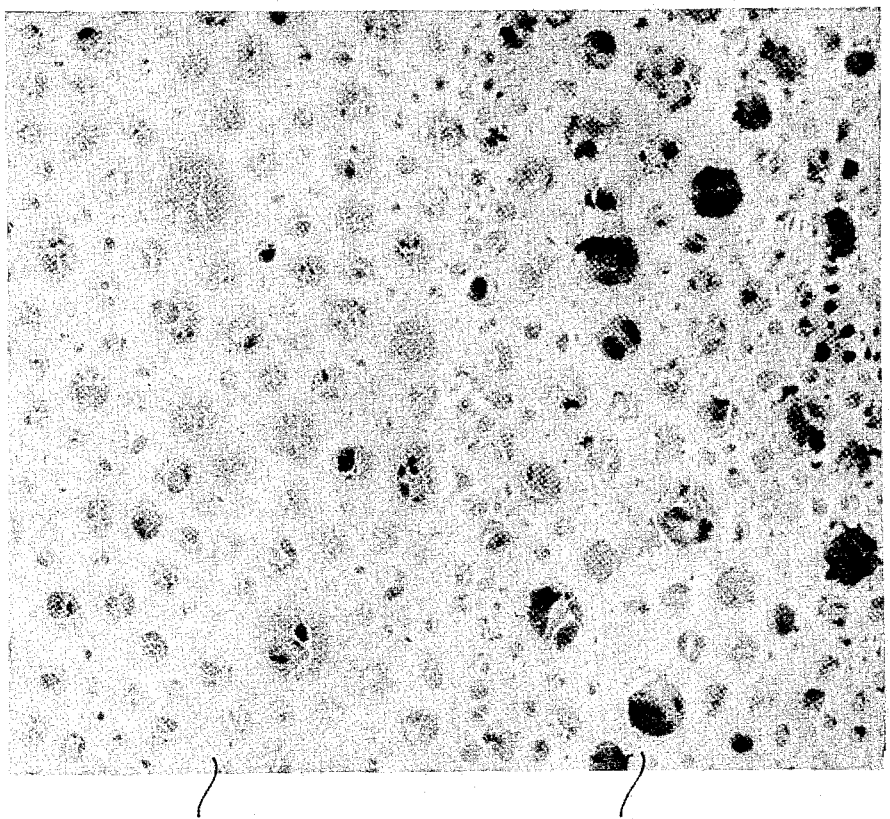
SURFACE OF SPONGE RUBBER FROM LATEX FOAM MOLDED AGAINST UNTREATED MOLD SURFACE
SURFACE OF SPONGE RUBBER FROM LATEX FOAM MOLDED AGAINST MOLD SURFACE TREATED WITH WATER-SOLUBLE POLYMERIC HYDROPHILIC COLLOID
INVENTOR
TOY T. SHIGEKAWA
BY
ATTORNEY United States Patent Office 2,693,006
Patented Nov. 2, 1954

2,693,006

MANUFACTURE OF SPONGE RUBBER ARTICLES

Toy T. Shigekawa, Mishawaka, Ind., assignor to United States Rubber Company, New York, N. Y., a corporation of New Jersey Application April 26, 1952, Serial No. 284,565

6 Claims. (Cl. 18—53)

This invention relates to the manufacture of sponge rubber articles from molded latex foam, and more particularly to increasing the porosity of the surface skin of the sponge article formed against the molding surface.

In the conventional process of making sponge rubber articles by forming a latex foam, molding and coagulating or gelling the foam to form the sponge rubber, and vulcanizing the thus formed sponge rubber, the surface of the sponge rubber article where it was in contact with the surface of the mold has a thin skin of less porosity than the highly porous interior of the sponge article. The present invention relates to increasing the porosity of this surface skin. It has been suggested to produce a sponge rubber that does not have a relatively impervious skin by coating the mold with a full strength crystalline coagulant salt, such as ammonium sulfate, so that the surface of the foam in contact with the mold surface is immediately coagulated, that is, before the interior or main body of the latex foam which is itself compounded with a small amount of such coagulating agent. Another suggestion has been to treat or lubricate the mold with a stabilizing agent which prevents the surface of the foam in contact with the mold surface from becoming coagulated or set while the main body of the foam is coagulated or set, with the result that when the sponge article is removed from the mold the body will have gelled with the exception of the uncoagulated outer layer or surface which will break down on removal of the article from the mold leaving a surface layer of open cells instead of a skin. The treatment of the mold surface with reagents having such drastic effects on the latex in the foam as to cause immediate coagulation of the foam, or the opposite effect of entirely preventing the setting or coagulation of the foam in contact with the mold surface, is too difficult in operation and requires far more care than can be taken under normal factory operations to obtain consistently satisfactory results. If the coagulant salts are applied too heavily to the mold surface, this will cause objectionable pits, pores and other imperfections in the sponge surface. On the other hand, too light a coating results in the normal highly impervious skin. When stabilizing agents, such as soaps and other surface-active agents are used to coat the mold surface, a slight excess of such material will cause the sponge surface to pull away or separate from the surface of the mold due to uneven shrinkage. These "pull-aways," as they are called, occur as depressions or blotches and are cause for rejection of the cushion in commercial practice. The present invention overcomes the objections of these prior methods.

According to the present invention, the molding surface of the mold is treated with a water-soluble polymeric hydrophilic colloidal material and the latex foam is molded against the thus treated mold surface.

The accompanying drawing is an enlarged photograph of a surface of a sponge rubber, one half of which has been molded against an untreated mold surface and the other half of which has been molded against a mold surface treated by one embodiment of the present invention.

In carrying out the present invention, the rubber latex is compounded with the usual compounding ingredients for subsequent vulcanization and formed into a foam in a known manner, e. g. by whipping air into the latex to form a fluid foam, or by mixing the latex with a preformed soap foam, or by chemically releasing a non-coagulating gas in the latex as by decomposition of hydrogen peroxide in the latex. The latex or the latex foam may be, and generally is, compounded with a gelling agent such as sodium silicofluoride, or a mixture of zinc oxide and an ammonium salt, so that after the molding operation, the foam will gel or coagulate on standing or heating. If the latex foam does not contain a gelling agent, the foam after molding may be coagulated by freezing or by contacting with a coagulant gas. The latex foam may be formed continuously or by a batch method in bulk and the desired amount of foam introduced into the molds, or the latex may be formed into a foam in the mold from measured amounts of latex and gas releasing agents, such as hydrogen peroxide. After the latex foam has been molded, it is coagulated or gelled to form sponge rubber, the sponge vulcanized at elevated temperature, stripped from the mold, washed and dried in conventional manner. The mold for the latex foam is conventional and may be a closed impervious metal mold, or may be an open mold such as a conveyor of impervious metal generally with side guide ledges as in the manufacture of sponge rubber sheet stock or flat stock, or the mold may take the form of flat metal pans of the desired dimensions of the sheets or flat stock to be formed. Any desired mold surface or portion thereof may be treated with the water-soluble polymeric hydrophilic colloidal material of the present invention to increase the porosity of the skin of the sponge rubber molded against such treated portion. Examples of such water-soluble polymeric hydrophilic colloidal material are alkali polyacrylates, e. g. sodium polyacrylate; carboxyalkyl cellulose, e. g., carboxy methyl cellulose; cellulose ethers e. g., methyl cellulose; polyvinyl alcohol; proteins, e. g., gelatin and casein; vegetable mucilages, e. g., sodium and ammonium alginates and locust bean gum; and similar materials commonly used as water-thickening agents. Such hydrophilic colloidal materials are non-surface-active and may be used in any desired amount on the mold surface. They are applied to the surface of the mold as water solutions by spraying, or daubing on with a cloth, or by any other convenient manner. The various materials will generally be applied in aqueous solutions ranging from 0.1% to 10% concentration depending on the material and way it is to be applied, since the viscosities of the solution of the various materials vary widely and the thickness of the aqueous solution used should be such that there is no difficulty in applying the solution by the method of application selected. For example, for spraying the solution onto the mold surface, convenient concentration ranges of various of the materials are 0.5 to 1.5% sodium polyacrylate, 0.2 to 0.8% ammonium alginate, 0.5 to 1.5% gelatin, 0.5 to 3% carboxy methyl cellulose, 0.5 to 10% polyvinyl alcohol, the high molecular weight polyvinyl alcohols which form thicker solutions being used in the lower concentrations. After applications of the aqueous solution of the polymeric hydrophilic colloidal material to the mold surface, it is allowed to at least partially dry. Generally the mold is warm from a previous vulcanization heat and the drying takes place in a matter of minutes or substantially automatically as the mold is being readied for the foam after the treatment according to the present invention.

The latex for preparing the latex foam may be a natural rubber latex, or a conjugated diene polymer synthetic rubber latex, or mixtures of any of the same. Such conjugated diene polymer synthetic rubber latex may be an aqueous emulsion polymerizate of one or a mixture of butadienes-1,3 for example, butadiene-1,3, 2-methyl-butadiene-1,3 (isoprene), 2-chlorobutadiene-1,3 (chloroprene), piperylene, 2,3-dimethyl butadiene-1,3. The conjugated diene polymer synthetic rubber latex, as known, may be a mixture of one or more of such butadienes-1,3 with one or more other polymerizable compounds which are capable of forming rubbery copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefins, such as styrene, and vinyl naphthalene; the alpha methylene carboxylic acids, and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The following illustrates the invention, all parts and percentages referred to herein being by weight:

A natural rubber latex was compounded according to the following formulation:

| Ingredients | Parts by Weight | |
|---|---|---|
| | Wet | Dry |
| Latex (60% solids) | 167 | 100 |
| Potassium Oleate | 5 | 1 |
| Sulfur | 4.2 | 2.5 |
| Antioxidant | 2.0 | 1.0 |
| Accelerator | 2.0 | .8 |
| Zinc Oxide | 12.5 | 5.0 |
| Sensitizer (Trimene Base) | .7 | .2 |
| Sodium Hexa Meta Phosphate | 2.5 | .5 |

The compounded latex was foamed by whipping in a Hobart beater to a density of about .12 grams per cubic cm. Twenty parts wet weight of a 20% sodium silicofluoride aqueous paste was thoroughly mixed into the foam. The thus sensitized foam was poured into an open aluminum pan mold 14" x 14" x 1½" which had been treated as follows: One half of the bottom molding surface of the mold was masked off with a piece of cardboard and the inner surface of the mold which was at room temperature was sprayed with a 1¼% aqueous solution of sodium polyacrylate. Sufficient spray was applied to completely wet the surface of the mold. The solution was allowed to dry two minutes at room temperature. The cardboard was removed exposing the clean non-treated half of the bottom molding surface. After pouring the foam in the mold, the mold was allowed to stand at room temperature for five minutes to gel the same, after which the mold with the gelled sponge therein was placed in a curing oven at 212° F. (atmospheric steam) for one-half hour. After curing, the cushion was removed from the mold, washed and dried. The skin on the portion of the surface of the sponge which was molded against the treated portion of the mold was visibly much more porous than the portion of the skin molded against the untreated portion of mold. That the difference in porosity of the two portions of the skin is effectively great may be seen from the figure in the drawing which is a half tone screen reproduction of a photograph of about twenty-five diameters magnification of part of the skin which was molded along the dividing line between the treated and non-treated portions of the mold surface. As shown in the captions in the drawing, the left half of the drawing shows the dense skin which was molded against the untreated portion of the mold surface and the right half of the drawing shows the vastly increased porosity of the skin which was molded against the portion of the mold which was treated with sodium polyacrylate according to the present invention. Similar photographs with treatments of a portion of the mold surface with aqueous solutions of various other water-soluble polymeric hydrophilic colloids, e. g., 5% polyvinyl alcohol, 0.75% ammonium alginate, 1% gelatin, 1% carboxymethyl cellulose, all show similar increases in the porosity of that portion of the skin molded against the portions of the mold treated according to the present invention. The increased pores in the skin molded against the treated surface of the mold are produced during the gelling period as may be seen from samples which have been removed from the mold after gelling and before vulcanizing where the skin is gelled with the readily observed increased porosity.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of increasing the porosity of the surface skin of a sponge rubber article from molded latex foam which comprises applying to at least a portion of the molding surface of a mold a water-soluble polymeric hydrophilic colloidal material, molding a latex foam against the thus treated mold surface and coagulating the foam.

2. The method of increasing the porosity of the surface skin of a sponge rubber article from molded latex foam which comprises applying to at least a portion of the molding surface of a mold an 0.1% to 10% aqueous solution of water-soluble material selected from the group consisting of alkali polyacrylates, carboxy alkyl cellulose, cellulose ethers, polyvinyl alcohol, proteins and vegetable mucilages, molding a latex foam against the thus treated mold surface and coagulating the foam.

3. The method of increasing the porosity of the surface skin of a sponge rubber article from molded latex foam which comprises applying to at least a portion of the molding surface of a mold sodium polyacrylate, molding a latex foam against the thus treated mold surface and coagulating the foam.

4. The method of increasing the porosity of the surface skin of a sponge rubber article from molded latex foam which comprises spraying on the molding surface of a metal mold an 0.1% to 10% aqueous solution of a water-soluble polymeric hydrophilic colloidal material, molding latex foam containing a gelling agent against the thus treated mold surface, and gelling the molded foam.

5. The method of increasing the porosity of the surface skin of a sponge rubber article from molded latex foam which comprises applying to the molding surface of a metal mold water-soluble material selected from the group consisting of alkali polyacrylates, carboxy alkyl cellulose, cellulose ethers, polyvinyl alcohol, proteins and vegetable mucilages, molding latex foam containing a gelling agent against the thus treated mold surface, and gelling the molded foam.

6. The method of increasing the porosity of the surface skin of a sponge rubber article from molded latex foam which comprises spraying on the molding surface of a metal mold an 0.5% to 1.5% aqueous solution of sodium polyacrylate, molding latex foam containing a gelling agent against the thus treated mold surface, and gelling the molded foam.

References Cited in the file of this patent

UNITED STATES PATENTS

| Number | Name | Date |
|---|---|---|
| 1,985,045 | Madge et al. | Dec. 18, 1934 |
| 2,227,809 | Greenup et al. | Jan. 7, 1941 |
| 2,333,679 | Schoonover | Nov. 9, 1943 |
| 2,376,244 | Freeman | May 15, 1945 |
| 2,388,153 | Jones | Oct. 30, 1945 |
| 2,476,827 | Wohler et al. | July 19, 1949 |
| 2,604,664 | Jordan | July 29, 1952 |

OTHER REFERENCES

"Colite," India Rubber World, November 1941, page 165, column 3, paragraph 3.